(12) United States Patent
Pan

(10) Patent No.: US 10,237,086 B2
(45) Date of Patent: Mar. 19, 2019

(54) SMART HOME WIRELESS CONTROL SYSTEM

(71) Applicant: GUANGDONG SUPER INTELLIGENT TECHNOLOGY CO., LTD., Dongguan, Guangdong (CN)

(72) Inventor: Feijian Pan, Guangdong (CN)

(73) Assignee: Guangdong United Industries Far East Co., Ltd., Guangdong (CN)

(*) Notice: Subject to any disclaimer, the term of this patent is extended or adjusted under 35 U.S.C. 154(b) by 565 days.

(21) Appl. No.: 14/980,081

(22) Filed: Dec. 28, 2015

(65) Prior Publication Data

US 2017/0026195 A1  Jan. 26, 2017

(30) Foreign Application Priority Data

Jul. 22, 2015  (CN) .......................... 2015 1 0439129

(51) Int. Cl.
```
H04B 10/00      (2013.01)
H04L 12/28      (2006.01)
G08C 17/02      (2006.01)
G08C 23/04      (2006.01)
H04W 4/021      (2018.01)
G06F 3/0346     (2013.01)
```

(52) U.S. Cl.
CPC .......... *H04L 12/2821* (2013.01); *G08C 17/02* (2013.01); *G08C 23/04* (2013.01); *H04L 12/282* (2013.01); *H04L 12/2827* (2013.01); *H04W 4/021* (2013.01); *G06F 3/0346* (2013.01); *H04L 2012/285* (2013.01); *H04L 2012/2841* (2013.01)

(58) Field of Classification Search
CPC .. H04B 10/40; H04B 10/114; H04B 10/1149; G08C 23/04; G08C 17/02; H04L 12/2821; H04L 12/2816; H04L 12/2807
USPC ....... 398/106, 107, 118, 119, 124, 125, 126, 398/127, 128, 130, 135, 172, 115; 340/12.5, 12.22, 825.69, 825.72, 825.22, 340/12.23; 348/734
See application file for complete search history.

(56) References Cited

U.S. PATENT DOCUMENTS

| | | | | |
|---|---|---|---|---|
| 2007/0140697 A1* | 6/2007 | Miyake | .................. | G08C 23/04 398/106 |
| 2014/0355588 A1* | 12/2014 | Cho | .................... | H04L 12/2816 370/338 |
| 2016/0072638 A1* | 3/2016 | Amer | .................. | H04L 12/2818 398/106 |

\* cited by examiner

*Primary Examiner* — Hanh Phan
(74) *Attorney, Agent, or Firm* — Alan D. Kamrath; Kamrath IP Lawfirm, P.A.

(57) ABSTRACT

A smart home wireless control system includes a mobile control terminal, a plurality of remote-controlled devices and a signal access point (AP), wherein the mobile control terminal and the remote-controlled devices exchange data through the AP, each remote-controlled device includes an access controller and a controlled appliance connected to the access controller, the inside of the access controller is provided with a wireless signal station and a counter, the mobile control terminal detects the signal intensities of the wireless signal stations of each remote-controlled device, and the mobile control terminal conducts smart control on the remote-controlled devices according to the changes of the received signal intensities of the remote-controlled devices.

15 Claims, 4 Drawing Sheets

SMART HOME WIRELESS CONTROL SYSTEM

FIELD OF THE INVENTION

The present invention relates to the field of home control systems, and more particularly, to a smart home wireless control system.

BACKGROUND OF THE INVENTION

With the development of technology and increasing life standards of the public, functions of such technology products as smartphone, tablet, smart devices and the like are getting perfect, the performances thereof are getting powerful, and the popularization degrees thereof are getting higher. More people join in the ranks of pursuing efficiency and experiencing higher life standards, and are full of expectation on conveniences that may be possibly brought by a smart system.

However, the present smart systems continuously use a conservative design idea, and are lack of innovation, resulting in that people feel most smart systems are not smart in practical application and experience. Not only the functions are not practical, but the operating process is tedious. It seems extremely tedious to switch layer-by-layer menus and interfaces on a control interface, finally find a related device and then operate; instead, the combined control of directly operating or installing such a device as an acousto-optic sensing device in front of a switch of the device seems to be more practical and effective; meanwhile, special training caused by the overturning of habits for using the smart system also makes users, particularly the old and children at home, to gradually lose interest on the smart home, which greatly reduces the practical value of the smart home.

SUMMARY OF THE INVENTION

Based on this, the present invention aims in providing a smart home wireless control system, which is convenient to use and solves the foregoing problems.

A smart home wireless control system includes a mobile control terminal, a plurality of remote-controlled devices and a signal access point (AP), wherein the mobile control terminal and the remote-controlled devices exchange data through the AP, each remote-controlled device includes an access controller and a controlled appliance connected to the access controller, the inside of the access controller is provided with a wireless signal station and a counter, the mobile control terminal detects the signal intensities of the wireless signal stations of each remote-controlled device, the mobile control terminal sends a WIFI instruction to the counter according to the changes of the received signal intensities of the remote-controlled devices to make the counter conduct such counting operations as adding and subtracting to trigger true and false conditions, and conducts smart control on the remote-controlled devices; when a user carriers the mobile control terminal to enter a service area of the remote-controlled device, issues an operation of adding 1 on the counter, and when the user carriers the mobile control terminal to leave the service area of the remote-controlled device, issues an operation of subtracting 1 on the counter.

Further, both the controlled appliance and the mobile control terminal used by different users have an unique device identity code thereof as a distinguishing marker through which the mobile control terminal distinguishes different controlled appliances; before conducting an adding operation, the counter checks through the identity code whether the mobile control terminal already sends an adding instruction; if the identity code is stored, then the counter does not change; and if the identity code is not stored, then the counter adds 1 and stores the identity code of the mobile control terminal; before conducting a subtracting operation, the counter checks whether the identity code of the mobile control terminal already sends an instruction is stored; if the identity code is stored, then the counter does not change; and if the identity code is not stored, then the counter subtracts 1 and deletes the stored device identity code.

Further, the remote-controlled devices of the controlled appliance are divided into a first type appliance, a second type appliance and a third type appliance; the access controller is divided into three types including a switch control unit, a motor control unit and a data conversion unit; and the first type appliance, the second type appliance and the third type appliance are respectively and correspondingly matched with the switch control unit, the motor control unit and the data conversion unit.

Further, the inside of the switch control unit includes an electronic or mechanical switch part, which can interrupt triggering through a self-provided IO port or control the switching-on/switching-off of a switch part through a WIFI instruction; when the "true" condition of the counter is triggered, the switch is switched to a switching-on state, and when the "false" condition of the counter is triggered, the switch is switched to a switching-off state.

Further, the inside of the motor control unit includes a mechanical switch part, which can interrupt triggering through a self-provided IO port or control the switching-on of a switch part through a WIFI instruction so as to output a forward control signal of a motor, control the switching-off of the switch part and output a reverse control signal of the motor; when the "true" condition of the counter is triggered, the switch is switched to an on state; when the "true" condition of the counter is triggered, the switch is switched to a switching-on state, and when the "false" condition of the counter is triggered, the switch is switched to a switching-off state.

Further, the data conversion unit is an expandable and programmable protocol conversion device which internally include an IO port to receive signal input and output, the input data of a designated IO port can be queried through a WIFI instruction, and meanwhile a designated IO port can be controlled to output data of a designated format; moreover, the inside of the data conversion unit can store a preset instruction triggered and outputted via a serial number, an output port and data contents of the preset instruction can be set through the WIFI instruction, and meanwhile the preset instruction can be set to be associated with the condition triggering of the counter, so as to trigger the output of a corresponding preset instruction when the conditions of the counter are changed.

Further, the data conversion unit includes a data acquisition device and an infrared emitter, and the data acquisition device is composed of a current collector and a thermometer.

Further, the current collector acquires a current used by a present connecting device, converts the current into data and sends the data to the AP through the data conversion unit, the infrared emitter converts the received data sent by the AP to the data conversion unit into an infrared signal and emits the infrared signal to such devices like television or air conditioner that can be remotely controlled through infrared rays, and the thermometer acquires the temperature of the current environment, converts the temperature into data and sends the data to the AP through the data conversion unit.

Further, the mobile control terminal includes a core processing module; when judging that a user enters a service area of the third type appliance, the core processing module firstly detects a current used by the third type appliance; if the current is less than or equal to a standby current, then the core processing module sends an instruction of enabling the controlled appliance, and meanwhile sends a counter adding instruction; if the current is greater than the standby current, the core processing module does not trigger any action, and sends a counter adding instruction; when judging that the user leaves the service area of the third type appliance, the core processing module sends a counter subtracting instruction; when the counting number of the counter after conducting the counter subtracting instruction is 0, the core processing module does not trigger any action if the current used by the third type appliance is less than or equal to the standby current, and sends a standby instruction if the current is greater than the standby current; and when the counting number of the counter after conducting the counter subtracting instruction is greater than 0, the core processing module does not trigger any action.

Further, the mobile control terminal includes a core processing module, a geomagnetic sensor and a direction sensor, and the geomagnetic sensor and the direction sensor are respectively connected to the core processing module; when direction information acquired by the geomagnetic sensor is within a setting range, the core processing module separately controls the set remote-controlled devices according to the pointing direction of the direction sensor.

Further, the direction information acquired by the geomagnetic sensor is the deflection of the mobile control terminal relative to the south and north poles of a geomagnetic field, and direction information acquired by the direction sensor is an inclination angle between each side of the mobile control terminal and a relative horizontal plane.

Further, the mobile control terminal further includes a triaxial accelerometer; when a user enters a preset range, the triaxial accelerometer is enabled; and when the user leaves the area, the triaxial accelerometer is closed.

Further, when the triaxial accelerometer detects that the acceleration is greater than a set point, the mobile control terminal is switched to a combined operation interface; the combined operation interface is mainly divided into two parts; one display interface is an operation interface pointing to a corresponding device, and the other display interface refers to an icon selection list of all the controlled appliances which are scanned at the current position and ordered according to the signal intensities.

Further, the user may enable the smart home wireless operation interface on a mobile phone at outdoors, and uses an external network to control the remote-controlled device, so that the counter conducts an operation of adding or subtracting 1 to trigger the true and false conditions.

A smart home wireless control system includes a mobile control terminal, a plurality of remote-controlled devices and a signal access point (AP), wherein the mobile control terminal and the remote-controlled devices exchange data through the AP, each remote-controlled device includes an access controller and a controlled appliance connected to the access controller, the inside of the access controller is provided with a wireless signal station and a counter, the mobile control terminal detects the signal intensities of the wireless signal stations of each remote-controlled device, and the mobile control terminal conducts smart control on the remote-controlled devices according to the changes of the received signal intensities of the remote-controlled devices; the mobile control terminal includes a core processing module, a geomagnetic sensor and a direction sensor, and the geomagnetic sensor and the direction sensor are respectively connected to the core processing module; when direction information acquired by the geomagnetic sensor is within a setting range, the core processing module separately controls the set remote-controlled devices according to the pointing direction of the direction sensor, and the mobile control terminal is switched to a combined operation interface, the combined operation interface is divided into two parts, one display interface is an operation interface pointing to a corresponding device, and the other display interface refers to an icon selection list of all the controlled appliances which are scanned at the current position and ordered according to the signal intensities.

Further, the direction information acquired by the geomagnetic sensor is the deflection of the mobile control terminal relative to the south and north poles of a geomagnetic field, and direction information acquired by the direction sensor is an inclination angle between each side of the mobile control terminal and a relative horizontal plane.

The smart home remote control system of the present invention can automatically complete the entire operation process, and has high intelligence level; the same mobile phone is used even for a television or other multifunctional appliances the user behavior demands of which are relatively difficult to predict; moreover, the control interface is quickly presented to the user to finish control with reference to position and pointing direction locking, so that the user does not need excessive operations and does not need to configure and use a plurality of different remote controllers. Meanwhile, the user does not need to worry about the electric power waste caused by forgetting closing the device when going out. Therefore, the entire home appliances are smarter and more environmental friendly.

DETAILED DESCRIPTION OF THE PREFERRED EMBODIMENTS

Figure 1:
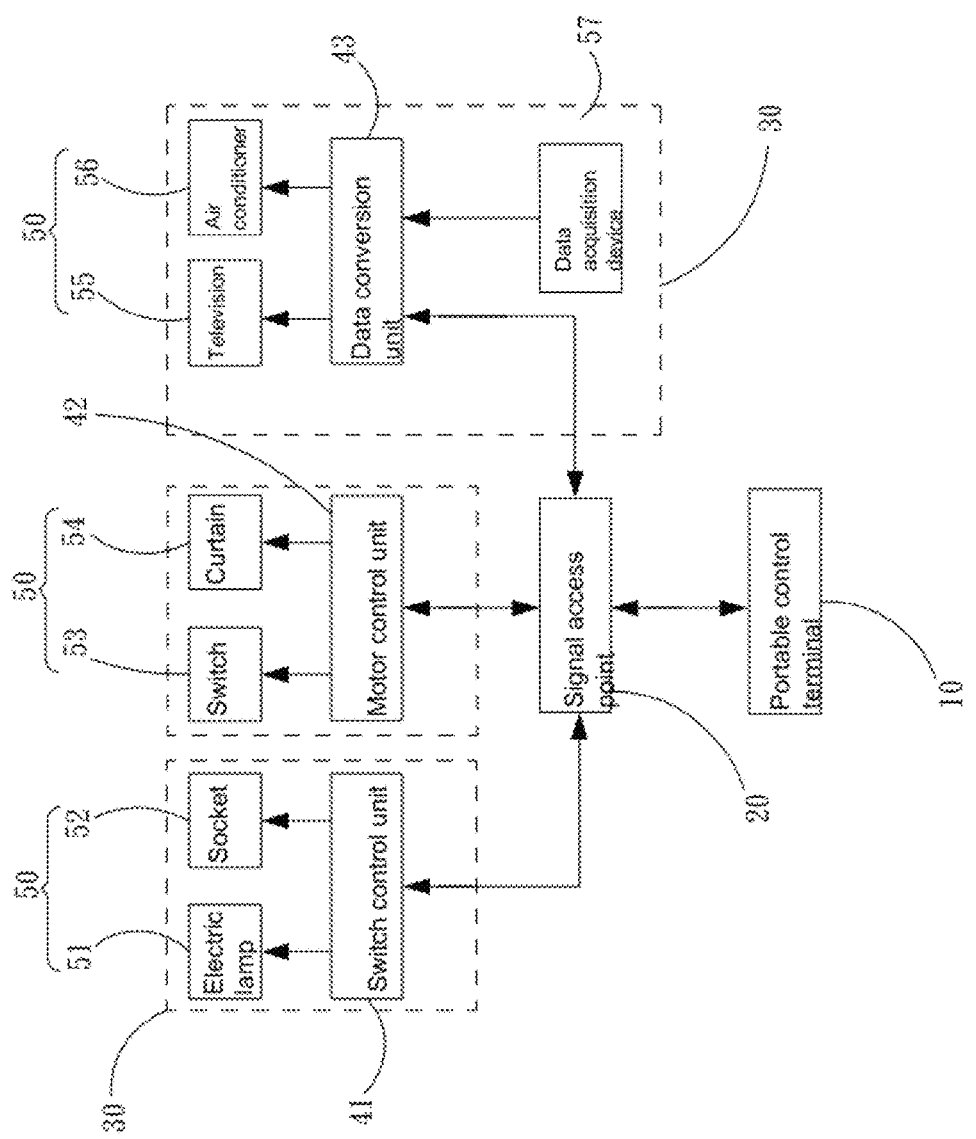
FIG. 1 is a structure schematic diagram of a smart home wireless control system according to the present invention.

In order to represent the technical solution of the present invention more clearly, the present invention will be further explained with reference to the drawings hereinafter.

Referring to FIG. 1 to FIG. 4, the present invention provides a smart home remote control system. The smart home remote control system includes a mobile control terminal 10, a plurality of remote-controlled devices 30 and a signal access point 20 (hereinafter referred to as AP), wherein the remote-controlled devices 30 are installed on different positions indoors such as room, hall or the like; the AP produces a WIFI signal, both the mobile control terminal 10 and the remote-controlled devices 30 are connected to the AP through the WIFI signal. The mobile control terminal 10 and the remote-controlled devices 30 exchange data through the AP, the mobile control terminal can control the remote-controlled devices 30, for example, light on-off, temperature regulation, television program selection and the like.

The mobile control terminal 10 can be a portable device which communicates through a wireless manner. In the embodiment, the mobile control terminal 10 is a smartphone. The mobile control terminal 10 includes a core processing module 11 and a geomagnetic sensor 12, a geomagnetic sensor 12, a direction sensor 13 and a triaxial accelerometer 14 which are respectively connected to the core processing module 11. The geomagnetic sensor 12 and the direction sensor 13 are configured to acquire the direction information of the mobile control terminal 10, wherein the direction information acquired by the geomagnetic sensor 12 is the deflection of the mobile control terminal 10 relative to the south and north poles of a geomagnetic field, and direction information acquired by the direction sensor 13 is an inclination angle between each side of the mobile control terminal 10 and a relative horizontal plane. When the direction information acquired by the geomagnetic sensor 12 is within a setting range, the core processing module 11 separately controls the set remote-controlled devices 30 according to the pointing direction of the direction sensor 13.

The triaxial accelerometer 14 is configured to measure the motion acceleration of the mobile control terminal 10. A preset range P1 is preset for an indoor space 90, wherein P1 is selected when configuring the smart home remote control system; when a user enters the preset range P1, the triaxial accelerometer 14 is enabled; and when the user leaves the area, the triaxial accelerometer 14 is closed. After the triaxial accelerometer 14 is enabled, when the motion acceleration of the mobile control terminal 10 changes largely, the triaxial accelerometer 14 feeds information back to the core processing module 11. The core processing module 11 sends an instruction to switch the smartphone to the frame of the smart home remote control system.

Each remote-controlled device 30 includes an access controller 40 and a controlled appliance 50 connected to the access controller 40. The remote-controlled devices 30 can be divided into multiple types; according to the remote-controlled devices 30 of different types, the access controller 40 can also be divided into three types including a switch control unit 41, a motor control unit 42 and a data conversion unit 43. The inside of the access controller 40 is also provided with a wireless signal station. The wireless signal station sends WIFI signals to the outside, the WIFI signals of the wireless signal station form a coverage area for the mobile control terminal 10 to recognize and connect. The mobile control terminal 10 detects the signal intensities of the wireless signal stations of each remote-controlled device 30, and the mobile control terminal 10 conducts smart control on the remote-controlled devices 30 according to the changes of the received signal intensities of the remote-controlled devices 30 so as to open or close the remote-controlled devices.

The controlled appliance 50 can be different types of household appliances. These household appliances are controlled using a switch control form, a motor control form or a data conversion form. To facilitate description, the remote-controlled devices 30 employing the above three types of controlled appliances 50 are divided into a first type appliance, a second type appliance and a third type appliance. Accordingly, when the remote-controlled devices are the first type appliance, the second type appliance and the third type appliance, the access controller 40 correspondingly employs the switch control unit 41, the motor control unit 42 or the data conversion unit 43.

The inside of the access controller 40 is provided with a counter, wherein the counter may conduct such counting operations as adding and subtracting through the WIFI instruction to trigger true and false conditions. Each controlled appliance and the mobile control terminal used by different users both have an unique device identity code thereof as a distinguishing marker through which the mobile control terminal '0 distinguishes different controlled appliances; before conducting an adding operation, the counter checks through the device identity code whether the mobile control terminal already sends an adding instruction; if the identity code is stored, then the counter does not change; and if the identity code is not stored, then the counter adds 1 and stores the identity code of the mobile control terminal; before conducting a subtracting operation, the counter checks whether the identity code of the mobile control terminal already sends an instruction is stored; if the identity code is stored, then the counter does not change; and if the identity code is not stored, then the counter subtracts 1 and deletes the stored device identity code. When a user carries the mobile control terminal 10 to enter a certain area, the mobile control terminal 10 sends a counter adding instruction to the remote-controlled device 30, then the counter conducts an operation of adding 1, representing that there is a user entering the service area of the remote-controlled device 30. Whereas, when a user carries the mobile control terminal 10 to leave from a certain area, the mobile control terminal 10 sends a counter subtracting instruction to the remote-controlled device 30, then the counter conducts an operation of subtracting 1, representing that all the users leave the service area of the remote-controlled device 30.

In the embodiment, it is to judge whether there is a user entering the area mainly through the connection signal intensity of the mobile control terminal and the remote-controlled device; moreover, other manners can also be employed for judging. When the user is outdoor, the user may also enable the operation interface of the smart home wireless control system on the mobile phone independently, and control the remote-controlled device 30 through an external network such as GPRS, internet and the like, and simulate the entering or leaving of users, so that the counter conducts an operation of subtracting 1 to trigger the true and false conditions.

The data conversion unit includes a data acquisition device 57 and an infrared emitter, and the data acquisition device includes a current collector and a thermometer.

The current collector acquires a current used by a present connecting device, converts the current into data and sends the data to the AP through the data conversion unit, the infrared emitter converts the received data sent by the AP to the data conversion unit into an infrared signal and emits the infrared signal to a television or an air conditioner, the thermometer acquires the temperature of the current environment, converts the temperature into data and sends the data to the AP through the data conversion unit, and the current collector is configured to detect the current of the device used presently. When judging that a user enters a service area of the third type appliance, the core processing module 11 firstly detects a current used by the television 55/air conditioner 56; if the current is less than or equal to a standby current, then the core processing module 11 sends an instruction of enabling the controlled appliance 50, and meanwhile sends a counter adding instruction; if the current is greater than the standby current (i.e., being used by someone), the core processing module does not trigger any action, and sends a counter adding instruction; in order to cooperatively detect the temperature, the remote-controlled device 30 further includes a thermometer 58, wherein the thermometer 58 detects interior temperature.

When judging that the user leaves the service area of the third type appliance, the core processing module 11 sends the counter subtracting instruction, where this includes two situations; when the counting number of the counter is "0", it represents that all the users leave the service area, and then the current used by the television 55/air conditioner 56 is detected; if the current used is less than or equal to the standby current, the core processing module does not trigger any action; if the current used is greater than the standby current, the core processing module 11 sends a standby instruction; when the counting number of the counter is greater than 0, it represents that someone is still using, and the core processing module does not trigger any action.

Figure 2:
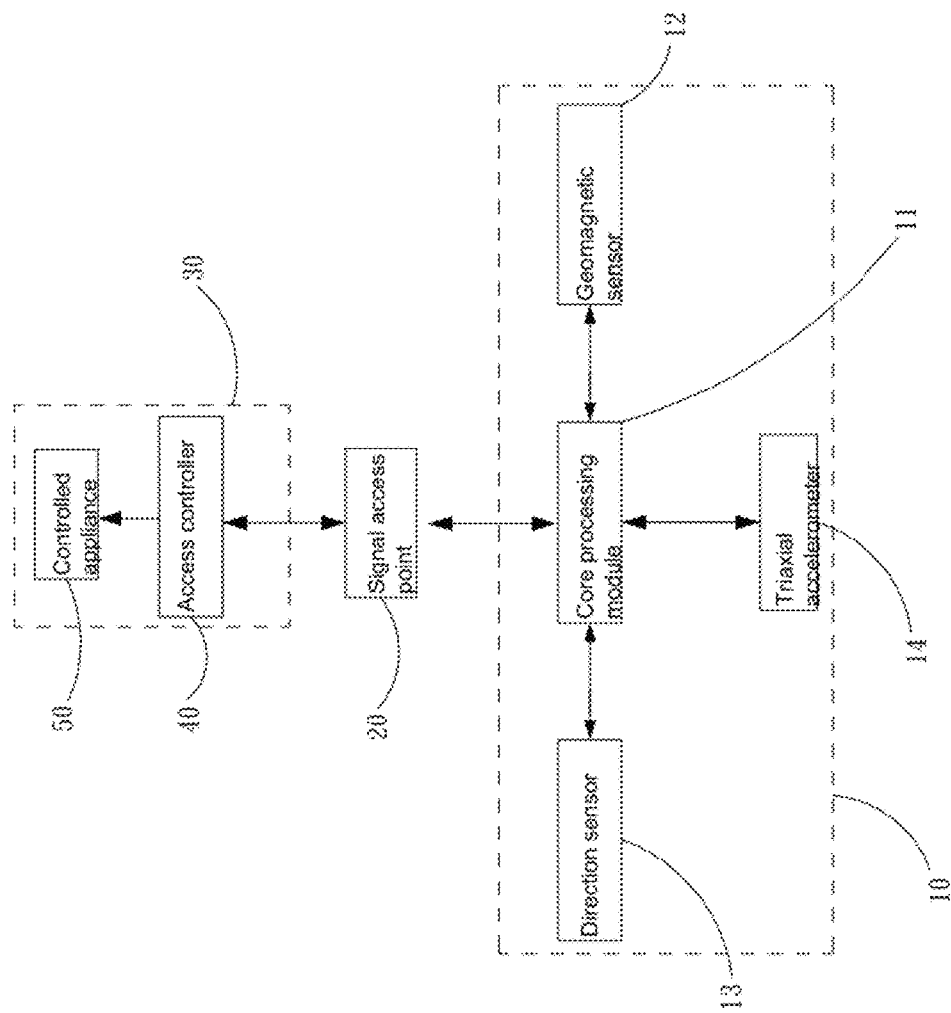
FIG. 2 is a structure schematic diagram of a mobile control terminal of the smart home wireless control system as shown in FIG. 1.
Figure 3:
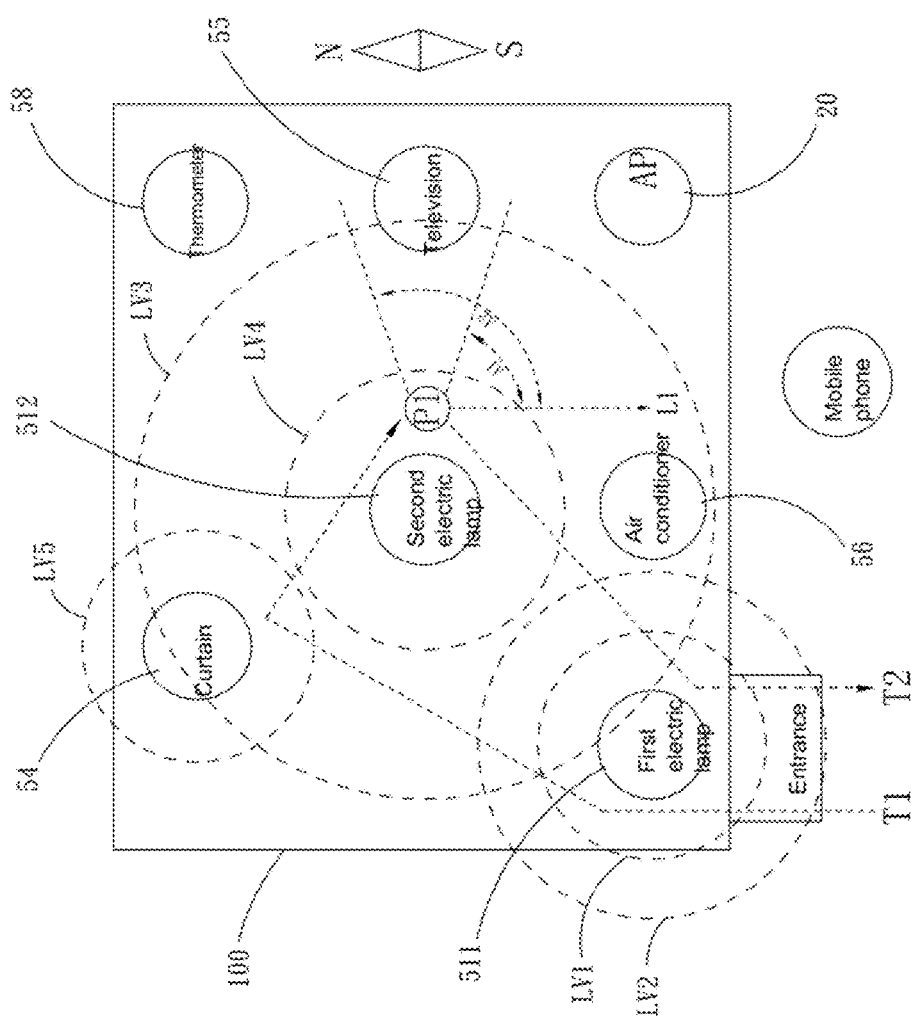
FIG. 3 is a flow chart for using of the smart home wireless control system in FIG. 1.
Figure 4:
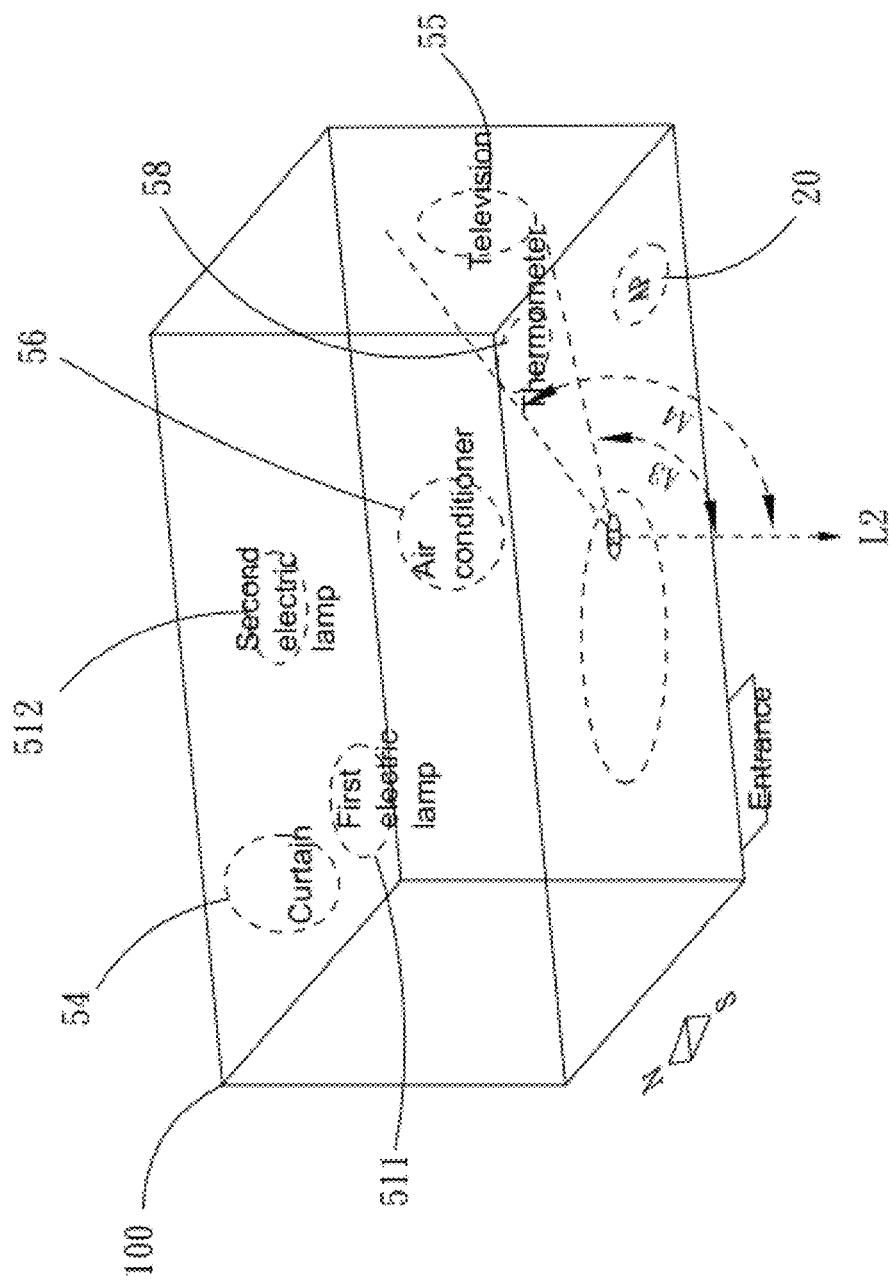
FIG. 4 is a schematic diagram for spatial use of the smart home wireless control system in FIG. 1.

The following refers to a specific embodiment of the present invention. In the embodiment, five remote-controlled devices 30 are configured. To facilitate description, the five remote-controlled devices are called as a first remote-controlled devices, a second remote-controlled device, a third remote-controlled device, a fourth remote-controlled device and a fifth remote-controlled device. The first remote-controlled device and the second remote-controlled device refer to first type appliances, the third remote-controlled device and the fourth remote-controlled device refer to the third type appliances, and the fifth remote-controlled device refers to the second type appliance. A first electric lamp 511, a second electric lamp 512, an air conditioner 56, a television 55 and a curtain 54 are respectively employed as the controlled appliances 50 of the first remote-controlled device, the second remote-controlled device, the third remote-controlled device, the fourth remote-controlled device and the fifth remote-controlled device. The distributions of different controlled appliances 50 are as shown in FIG. 2 and FIG. 3. A user enters the room along route T1 and leaves the room along a route T2. The specific working process of the smart home remote control system is as follows: [0038] The user carries a mobile phone to enter the room 100 through an entrance; when detecting that the intensity of a WIFI signal sent by the first remote-controlled device reaches LV1, the mobile phone automatically sends a counter adding instruction to the first remote-controlled device through an AP; at this moment, the state of the counter changes from 0 to 1 to trigger a "true" condition, so that a switch of the first electric lamp 511 is switched on and the first electric lamp is lightened. After that, the user carries the mobile phone to enter an area where the intensity of a WIFI signal sent by the second remote-controlled device reaches LV3, the mobile phone automatically sends a counter adding instruction to the second remote-controlled device through the AP; at this moment, the counter of the second remote-controlled device changes from 0 to 1 to trigger a "true" condition, so that a switch of the second electric lamp 512 is switched on and the second electric lamp is turned on.

The core processing module 11 of the mobile phone judges that the advancing direction of the user is matched with T1 (i.e., the user enters from the entrance) according to the changes of the WIFI signal intensities of the first remote-controlled device and the second remote-controlled device; therefore, the mobile phone automatically collects the external temperature information of the air conditioner 56 from the thermometer 58 through the AP, and compares the temperature information with a temperature range value set by the user; when the temperature is higher than the temperature range, the mobile phone automatically sends a preset refrigerating instruction to the third remote-controlled device through the AP, and sends a preset heating instruction when the temperature is lower than the temperature range; the mobile phone after sending any instruction to the air conditioner 56, will read the current used presently by the air conditioner 56 from the current collector 57 through the AP; when the current used is greater than a preset standby current, the mobile phone automatically sends a counter adding instruction to the third remote-controlled device through the AP, and the third remote-controlled device checks that the mobile control terminal has sent the adding instruction through the device identity code; therefore, the counter does not change.

The user moves continuously. When the user carries the mobile phone to move to an area where the intensity of the WIFI signal sent by the first remote-controlled device is less than LV2, the mobile phone automatically sends a counter subtracting instruction to the first remote-controlled device 20 through the AP; at this moment, the counter of the first electric lamp 511 changes from 1 to 0 to trigger a "false" condition, then the switch of the first electric lamp 511 is switched off and the first electric lamp is turned off; when the user carries the mobile phone to move to a crossover position where the intensity of the WIFI signal sent by the fifth remote-controlled device 20 reaches LV5 and the intensity of the WIFI signal sent by the second remote-controlled device is within the scope of LV3, the mobile phone automatically sends a counter adding instruction to the curtain 54 through the AP; at this moment, the counter of the curtain 54 changes from 0 to 1 to trigger a "true" condition, so that a switch of the curtain 54 is switched on and the curtain is forwards pulled opened.

When the user moves to position P1, the mobile phone automatically enables the triaxial accelerometer 14 to collect data in real time; when the user takes out the mobile phone and shakes quickly, the data collected by the mobile phone through the triaxial accelerometer 14 will change consistently in a tiny interval with big differences. when the tremendous change exceeds 1 s and still does not stop, a screen of the mobile phone is switched to the operation interface of the smart home remote control system; when the angle of the horizontal pointing direction of the mobile phone relative to L1 is between A1 and A2, and meanwhile the angle of the vertical pointing direction thereof relative to L2 is between A3 and A4, the mobile phone judges that the device to which the user points currently is the television 55; therefore, the operation interface is displayed as a simulated interface of a remote controller of the television 55; when the user clicks a button on the operation interface, the mobile phone will automatically send an instruction associated with the button clicked by the user to the television 55 via the fourth remote-controlled device through the AP; the mobile phone after sending an instruction to the fourth remote-controlled device in each time, will read the current used presently by the television 55 from the current collector 57; when the current used is greater than a preset standby current, the mobile phone will automatically send a counter adding instruction to the fourth remote-controlled device through the AP; when the current used is less than or equal to the preset standby current, the mobile phone will automatically send a counter adding instruction to the fourth remote-controlled device through the AP, wherein the fourth remote-controlled device only conducts counter adding and subtracting operations, but does not trigger any action; if the angle of the horizontal pointing direction of the mobile phone relative to L1 is between A1 and A2, but the inclination angle of the mobile phone on the vertical direction exceeds the range of A3 and A4, the display interface of the mobile phone is switched to a combined operation interface, while the combined operation interface is mainly divided into two parts, wherein two thirds of the display interface refers to an operation interface pointing to a corresponding device, and one third of the interface refers to an icon selection list of all the controlled appliances which are scanned at the current position and ordered according to the signal intensities. That is, the signal intensities sent by the controlled appliances are ordered as follows: television 55>second electric lamp 512>air conditioner 56>curtain 54>first electric lamp 511; the smart home remote control system will display the switch interface of the electric lamp when pointing to the first electric lamp 511 or the second electric lamp 512 according to the logic above, display the opening-closing interface of the curtain when pointing to the curtain, display the simulated interface of the remote controller of the air conditioner when pointing to the air conditioner, and finish controlling of a corresponding controlled terminal through the operation of the user.

Then the user leaves the room from the position P1 in an advancing manner approaching to the route T2; when the user carries the mobile phone to enter the area where the intensity of the WIFI signal sent by the first remote-controlled device reaches LV1, the mobile phone automatically sends a counter adding instruction to the first electric lamp 511 through the AP; at this moment, the counter of the first electric lamp 511 changes from 0 to 1 to trigger a "true" condition, so that the switch of the first electric lamp 511 is switched on and the first electric lamp is turned on; after that, when the user carries the mobile phone to enter an area where the intensity of the WIFI signal sent by the first electric lamp 511 exceeds LV2, the mobile phone automatically judges that the advancing direction of the user is matched with T2 (i.e., from the inside to the entrance) according to an advancing route from LV3 to LV1; then the mobile phone automatically sends a counter subtracting instruction to the first remote-controlled device, the second remote-controlled device, the third remote-controlled device, the fourth remote-controlled device and the fifth remote-controlled device respectively through the AP. At this moment, the counter of the first remote-controlled device changes from 1 to 0 to trigger a "false" condition, so that the switch of the first electric lamp 511 is switched off and the first electric lamp is turned off; the counter of the second remote-controlled device changes from 1 to 0 to trigger a "false" condition, so that the switch of the second electric lamp 512 is switched off and the second electric lamp is turned off; at this moment, the counter of the fifth remote-controlled device changes from 1 to 0 to trigger a "false" condition, so that the switch of the curtain 54 is switched off and the curtain is reversely closed; the counter of the fourth remote-controlled device changes from 1 to 0, then the mobile phone automatically reads the counter of the fourth remote-controlled device from the fourth remote-controlled device through the AP, reads the current used presently by the television 55 from the current collector 57, and obtains that the counter is 0, but the current used is greater than the standby current; therefore, the mobile phone automatically sends a turning-off instruction to the television 55 via the fourth remote-controlled device through the AP, so that the television 55 enters a turning-off state; the counter of the third remote-controlled device changes from 1 to 0, then the mobile phone automatically reads the counter of the third remote-controlled device from the third remote-controlled device through the AP, reads the current used presently by the air conditioner 56 from the current collector 57, and obtains that the counter is 0, but the current used is greater than the standby current; therefore, the mobile phone automatically sends a standby instruction to the air conditioner via the third remote-controlled device through the AP, so that the air conditioner 56 enters a standby state.

It can be known from the above that the smart home remote control system of the present invention can automatically complete the entire operation process, and has high intelligence level; the same mobile phone is used even for the television 55 the user behavior demands of which are relatively difficult to predict; moreover, the control interface is quickly presented to the user to finish control with reference to position and pointing direction locking, so that the user does not need excessive operations and does not need to configure and use a plurality of different remote controllers. Meanwhile, the user does not need to worry about the electric power waste caused by forgetting closing the device when going out. Therefore, the entire home appliances are smarter and more environmental friendly.

The embodiment disclosed above only expresses one implementation manner of the present invention, which is described more specifically and in details, but cannot thus be deemed as a limitation to the patent scope of the present invention. It should be noted that those having ordinary skills in the art of the invention may also make many modifications and improvements without departing from the conception of the invention which shall all fall within the protection scope of the invention. Therefore, the patent protection scope of the present invention shall be subjected to the appended claims.

What is claimed is:

1. A smart home wireless control system, comprising a mobile control terminal, a plurality of remote-controlled devices and a signal access point (AP), wherein the mobile control terminal and the remote-controlled devices exchange data through the AP, each remote-controlled device comprises an access controller and a controlled appliance connected to the access controller, the inside of the access controller is provided with a wireless signal station and a counter, the mobile control terminal detects the signal intensities of the wireless signal stations of each remote-controlled device, the mobile control terminal sends a WIFI instruction to the counter according to the changes of the received signal intensities of the remote-controlled devices to make the counter conduct such counting operations as adding and subtracting to trigger true and false conditions, and conducts smart control on the remote-controlled devices; when a user carries the mobile control terminal to enter a service area of the remote-controlled device, issues an operation of adding 1 on the counter, and when the user carries the mobile control terminal to leave the service area of the remote-controlled device, issues an operation of subtracting 1 on the counter, and both the controlled appliance and the mobile control terminal used by different users have an unique device identity code thereof as a distinguishing marker through which the mobile control terminal distinguishes different controlled appliances; before conducting an adding operation, the counter checks through the identity code whether the mobile control terminal already sends an adding instruction; if the identity code is stored, then the counter does not change; and if the identity code is not stored, then the counter adds 1 and stores the identity code of the mobile control terminal; before conducting a subtracting operation, the counter checks whether the identity code of the mobile control terminal already sends an instruction is stored; if the identity code is stored, then the counter does not change; and if the identity code is not stored, then the counter subtracts 1 and deletes the stored device identity code.

2. The smart home wireless control system according to claim 1, wherein the remote-controlled devices of the controlled appliance are divided into a first type appliance, a second type appliance and a third type appliance; the access controller is divided into three types comprising a switch control unit, a motor control unit and a data conversion unit; and the first type appliance, the second type appliance and the third type appliance are respectively and correspondingly matched with the switch control unit, the motor control unit and the data conversion unit.

3. The smart home wireless control system according to claim 2, wherein the inside of the switch control unit comprises an electronic or mechanical switch part, which can interrupt triggering through a self-provided IO port or control the switching-on/switching-off of a switch part through a WIFI instruction; when the "true" condition of the counter is triggered, the switch is switched to a switching-on state, and when the "false" condition of the counter is triggered, the switch is switched to a switching-off state.

4. The smart home wireless control system according to claim 2, wherein the inside of the motor control unit comprises a mechanical switch part, which can interrupt triggering through a self-provided IO port or control the switching-on of a switch part through a WIFI instruction so as to output a forward control signal of a motor, control the switching-off of the switch part and output a reverse control signal of the motor; when the "true" condition of the counter is triggered, the switch is switched to an on state; when the "true" condition of the counter is triggered, the switch is switched to a switching-on state, and when the "false" condition of the counter is triggered, the switch is switched to a switching-off state.

5. The smart home wireless control system according to claim 2, wherein the data conversion unit is an expandable and programmable protocol conversion device which internally comprise an IO port to receive signal input and output, the input data of a designated IO port can be queried through a WIFI instruction, and meanwhile a designated IO port can be controlled to output data of a designated format; moreover, the inside of the data conversion unit can store a preset instruction triggered and outputted via a serial number, an output port and data contents of the preset instruction can be set through the WIFI instruction, and meanwhile the preset instruction can be set to be associated with the condition triggering of the counter, so as to trigger the output of a corresponding preset instruction when the conditions of the counter are changed.

6. The smart home wireless control system according to claim 5, wherein the data conversion unit comprises a data acquisition device and an infrared emitter, and the data acquisition device is composed of a current collector and a thermometer.

7. The smart home wireless control system according to claim 6, wherein the current collector acquires a current used by a present connecting device, converts the current into data and sends the data to the AP through the data conversion unit, the infrared emitter converts the received data sent by the AP to the data conversion unit into an infrared signal and emits the infrared signal to the controlled appliance, and the thermometer acquires the temperature of the current environment, converts the temperature into data and sends the data to the AP through the data conversion unit.

8. The smart home wireless control system according to claim 7, wherein the mobile control terminal comprises a core processing module; when judging that a user enters a service area of the third type appliance, the core processing module firstly detects a current used by the third type appliance; if the current is less than or equal to a standby current, then the core processing module sends an instruction of enabling the controlled appliance, and meanwhile sends a counter adding instruction; if the current is greater than the standby current, the core processing module does not trigger any action, and sends a counter adding instruction; when judging that the user leaves the service area of the third type appliance, the core processing module sends a counter subtracting instruction; when the counting number of the counter after conducting the counter subtracting instruction is 0, the core processing module does not trigger any action if the current used by the third type appliance is less than or equal to the standby current, and sends a standby instruction if the current is greater than the standby current; and when the counting number of the counter after conducting the counter subtracting instruction is greater than 0, the core processing module does not trigger any action.

9. The smart home wireless control system according to claim 1, wherein the mobile control terminal comprises a core processing module, a geomagnetic sensor and a direction sensor, and the geomagnetic sensor and the direction sensor are respectively connected to the core processing module; when direction information acquired by the geomagnetic sensor is within a setting range, the core processing module separately controls the set remote-controlled devices according to the pointing direction of the direction sensor.

10. The smart home wireless control system according to claim 9, wherein the direction information acquired by the geomagnetic sensor is the deflection of the mobile control terminal relative to the south and north poles of a geomagnetic field, and direction information acquired by the direction sensor is an inclination angle between each side of the mobile control terminal and a relative horizontal plane.

11. The smart home wireless control system according to claim 10, wherein the user may enable the smart home wireless control system on a mobile phone at outdoors, and uses an external network to control the remote-controlled device, so that the counter conducts an operation of adding or subtracting 1 to trigger the true and false conditions.

12. The smart home wireless control system according to claim 9, wherein the mobile control terminal further comprises a triaxial accelerometer; when a user enters a preset range, the triaxial accelerometer is enabled; and when the user leaves the area, the triaxial accelerometer is closed.

13. The smart home wireless control system according to claim 12, wherein when the triaxial accelerometer detects that the acceleration is greater than a set point, the mobile control terminal is switched to a combined operation interface; the combined operation interface is mainly divided into two parts; one display interface is an operation interface pointing to a corresponding device, and the other display interface refers to an icon selection list of all the controlled appliances which are scanned at the current position and ordered according to the signal intensities.

14. A smart home wireless control system, comprising a mobile control terminal, a plurality of remote-controlled devices and a signal access point (AP), wherein the mobile control terminal and the remote-controlled devices exchange data through the AP, each remote-controlled device includes an access controller and a controlled appliance connected to the access controller, the inside of the access controller is provided with a wireless signal station and a counter, the mobile control terminal detects the signal intensities of the wireless signal stations of each remote-controlled device, and the mobile control terminal conducts smart control on the remote-controlled devices according to the changes of the received signal intensities of the remote-controlled devices; the mobile control terminal includes a core processing module, a geomagnetic sensor and a direction sensor, and the geomagnetic sensor and the direction sensor are respectively connected to the core processing module; when direction information acquired by the geomagnetic sensor is within a setting range, the core processing module separately controls the set remote-controlled devices according to the pointing direction of the direction sensor, and the mobile control terminal is switched to a combined operation interface, the combined operation interface is divided into two parts, one display interface is an operation interface pointing to a corresponding device, and the other display interface refers to an icon selection list of all the controlled appliances which are scanned at the current position and ordered according to the signal intensities.

15. The smart home wireless control system according to claim 14, wherein the direction information acquired by the geomagnetic sensor is the deflection of the mobile control terminal relative to the south and north poles of a geomagnetic field, and direction information acquired by the direction sensor is an inclination angle between each side of the mobile control terminal and a relative horizontal plane.

* * * * *